Oct. 16, 1928.
J. W. THOMPSON
MECHANICAL TOY
Filed Aug. 13, 1926
1,688,097
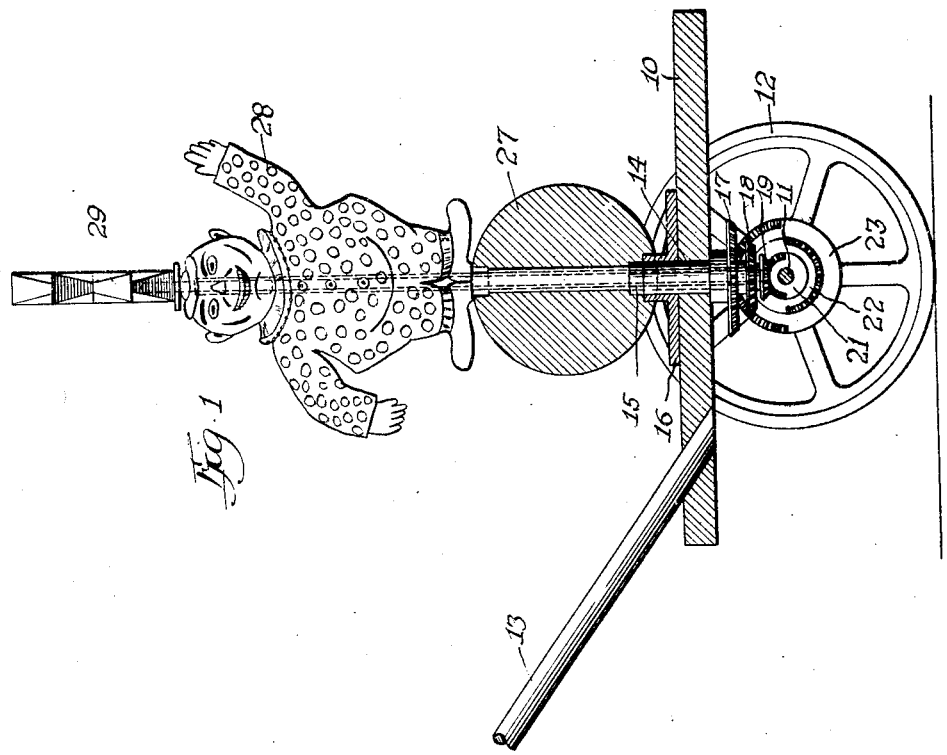
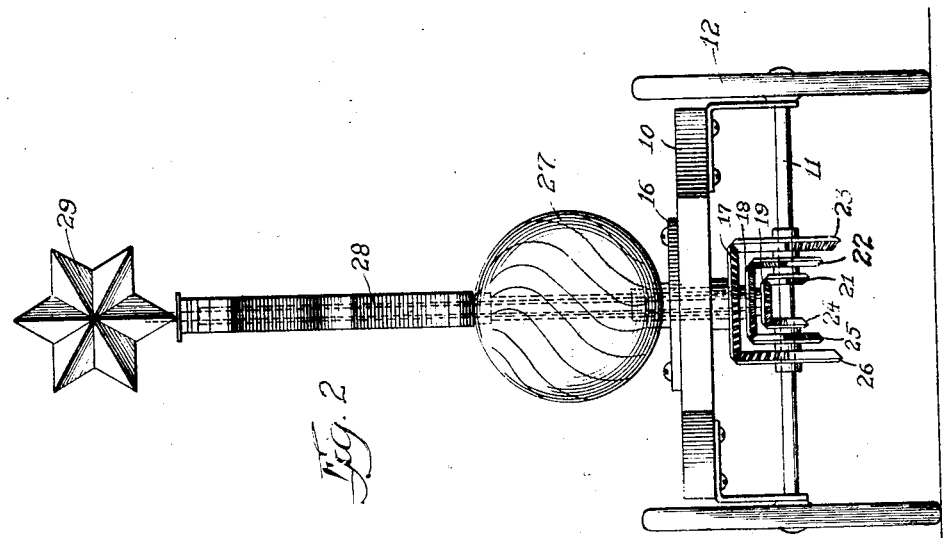
Inventor
John W. Thompson
By Wilkinson, Huxley, Byron & Knight
Attys Patented Oct. 16, 1928.

1,688,097

UNITED STATES PATENT OFFICE.

JOHN W. THOMPSON, OF OAK PARK, ILLINOIS, ASSIGNOR TO MARSHALL FIELD & COMPANY, OF CHICAGO, ILLINOIS, A CORPORATION OF ILLINOIS.

MECHANICAL TOY.

Application filed August 13, 1926. Serial No. 128,941.

My invention relates to improvements in mechanical toys and more especially the type having a platform mounted on wheels and adapted to be drawn on the ground, and having mounted thereon a plurality of objects attractive to the eye which are moved through connections with the rotating axle to create a combined visual effect.

One of the objects of my invention is to provide a platform, mounted on wheels and axle, and which forms a support for a plurality of movable objects which may be either animate or geometrical, or a combination of these, each having a reversing movement and so positioned relatively to each other that they, collectively, create a novel visual effect.

Another object of my invention is to provide a mechanical toy of this type, the objects mounted thereon being driven through the instrumentality of mechanism connected with the rotating axle so as to give the desired mechanical movement.

Another object of my invention is to provide a driving means for this type of mechanical toy, comprising mutilated gearing which is adapted to mesh with other gear elements so as to alternately drive the mounted objects in a given direction and allow them to be moved in a reverse direction when not in mesh.

In the illustrated form of my invention I have provided a platform mounted on wheels and axle having mounted on its upper surface a plurality of objects adapted to rotate on a single axis, each mounted object being connected with a separate gear wheel. Fixed to the axle in a position so as to engage the separate gear wheels are two oppositely disposed series of mutilated gears, the teeth of which are disposed on an arc of 180°, the remaining 180° being blank and spaced from its corresponding wheel. The arc of teeth as found on the mutilated gears are positioned oppositely on alternate gears so that the driving effect of the rotating axle on the mounted objects will be that of opposite directions for adjacent objects periodically reversing.

The objects of my invention will be more fully understood from the following detail description, reference being had to the accompanying drawings, in which—

Figure 1 shows a side elevation, partly in cross-section, of one form of my invention disclosing the movable objects and the driving gear;

Figure 2 is an end view of Figure 1 showing the specific arrangement of gear mechanism.

Referring to Figure 1, 10 represents a platform mounted on axle 11 and wheels 12, which is adapted to be drawn by the handle 13 along the ground. Platform 10 has an opening 14 in which is mounted a bearing sleeve 15 held by the bracket 16, the bearing sleeve containing three concentric shafts, as shown in Figures 1 and 2, adapted for separate rotation, one object being mounted on each. On the lower end of each shaft are mounted gears 17, 18 and 19 respectively. Positioned on the axle 11 are two sets of mutilated gears designated 21, 22 and 23 comprising one set, 24, 25 and 26 comprising the other set, each set being oppositely disposed, each gear having teeth on alternate arcs of 180°. Three shafts project above the platform, as shown, and are of different length so as to receive the three objects, such as the ball 27, the clown 28 and the star 29.

In operation, rotation of the axle 11 will effect rotation of the six mutilated gears in the same direction, the gears of one group, however, effecting rotation of the cooperating gear wheels in one direction, whereas the gears in the other group will effect rotation in a reverse direction, it being noted that the two mutilated gears cooperating with a single gear wheel are in mesh alternately. This series of gearing accomplishes the desired mechanical movement with the result that the three mounted objects rotate periodically in reverse directions, adjacent objects rotating oppositely.

In the form illustrated in practice it appears as though the clown was standing on a rotating ball while turning in the opposite direction and balancing the rotating star on his head.

The above detail description and the accompanying drawings illustrate the preferred embodiments of my invention, the scope of which, however, is set forth in the appended claim.

I claim:

In a mechanical toy, a platform, wheels and axle supporting said platform, a plurality of objects attractive to the eye separately mounted on said platform and each adapted to move independently of the other periodically in reverse directions so as to give a combined visual effect, mutilated gears on said axle, other gears connected to said objects and each adapted to be driven by two of the mutilated gears alternately to effect a reversal in movement of said objects, adjacent objects moving in opposite directions.

Signed at Chicago, Illinois, this 9th day of August, 1926.

JOHN W. THOMPSON.